(12) United States Patent
Rhodes et al.

(10) Patent No.: US 7,490,845 B1
(45) Date of Patent: Feb. 17, 2009

(54) FIFTH WHEEL MOUNTING PIN RISER ADAPTATION

(75) Inventors: James Matthew Rhodes, Pelham, AL (US); Steven William Mann, Gardendale, AL (US)

(73) Assignee: Fontaine International, Irondale, AL (US)

( * ) Notice: Subject to any disclaimer, the term of this patent is extended or adjusted under 35 U.S.C. 154(b) by 337 days.

(21) Appl. No.: 11/297,848

(22) Filed: Dec. 8, 2005

(51) Int. Cl.
*B62D 53/06* (2006.01)

(52) U.S. Cl. .................. 280/433; 280/437; 280/438.1; 411/351

(58) Field of Classification Search .................. 280/433, 280/437, 438.1; 411/351
See application file for complete search history.

(56) References Cited

U.S. PATENT DOCUMENTS

| | | | | |
|---|---|---|---|---|
| 4,391,559 A | * | 7/1983 | Mizusawa | 411/45 |
| D327,464 S | * | 6/1992 | Mukics | D12/162 |
| 5,211,519 A | * | 5/1993 | Saito | 411/45 |
| 6,045,309 A | * | 4/2000 | LeVey | 411/45 |
| 6,182,996 B1 | * | 2/2001 | Koetter et al. | 280/433 |
| 6,540,461 B1 | * | 4/2003 | Hawang | 411/48 |

* cited by examiner

*Primary Examiner*—Joanne Silbermann
*Assistant Examiner*—Marlon A Arce Diaz
(74) *Attorney, Agent, or Firm*—George P. Kobler; J. Mark Bledsoe; Lanler Ford Shaver & Payne PC

(57) ABSTRACT

A fifth wheel mounting pin riser adaptation is provided, said riser adaptation allowing a mounting pin to be easily extracted from a fifth wheel assembly.

9 Claims, 6 Drawing Sheets

FIFTH WHEEL MOUNTING PIN RISER ADAPTATION

BACKGROUND

1. Field of the Invention

The present invention relates generally to fifth wheel assemblies for coupling semi-trailers to tractors. More particularly the invention relates to a fifth wheel mounting pin. Still more particularly, the invention relates to a riser adaptation on a fifth wheel to simplify the extraction of mounting pins.

2. Description of the Related Art

Large highway freight trailers are usually coupled to an associated tractor by means of a fifth wheel assembly. The fifth wheel assembly, located about the longitudinal axis of the tractor frame between the rear drive wheels and the front steering system, often contains a mounting bracket and a hitch plate. The hitch plate is coupled to the mounting bracket by mounting pins on both sides of the fifth wheel assembly which are inserted from the exterior of the hitch plate assembly through the hitch plate and mounting bracket.

Mounting pins are retained in place by either bolting them to the side of the fifth wheel or by using a retaining pin or bolt. However, due to the tight fit of the mounting pin to the fifth wheel assembly, as well as corrosion, grime, and other factors, extraction of the mounting pin can be extremely difficult. A great amount of force must often be used to pry the mounting pin from the fifth wheel assembly. Furthermore, in certain types of fifth wheel assemblies, special tools are required to assist in the extraction of mounting pins.

SUMMARY

The present disclosure is directed to provide a means for facilitating the extraction of fifth wheel mounting pins. A riser adaptation can be incorporated on the outside of the hitch plate such that rotation of a winged mounting pin will cause the wings of the mounting pin to traverse the ramps of the riser adaptation, causing the mounting pin to exit the fifth wheel assembly. The mounting pin can be equipped with a feature such as a hex head bolt, hex socket head, or square head, to allow for extraction by standard tools, and to remove the need for specialized tools. Furthermore, the mounting pin can be chamfered or rounded at the contact points with the riser adaptation to ensure smooth operation while the pin is rotated.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

The fifth wheel mounting pin riser adaptation should be incorporated into the hitch plate at its initial manufacturing. However, it may be retro-fit on an existing hitch plate by traditional welding, bolting, or other attachment methods. If retro-fit, the riser adaptation should be made of metal or any other material of sufficient strength to withstand the forces which will be placed upon it under normal operating conditions.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
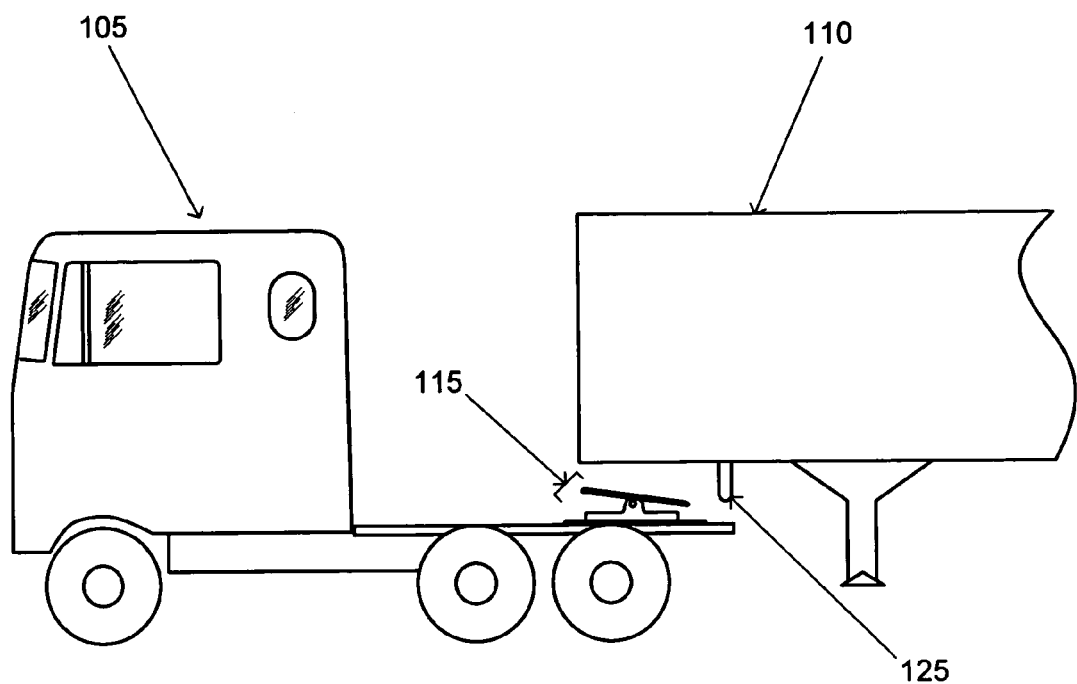
FIG. 1 is an exemplary towing vehicle and trailer to depict general operation of a fifth wheel hitch assembly.
Figure 2:
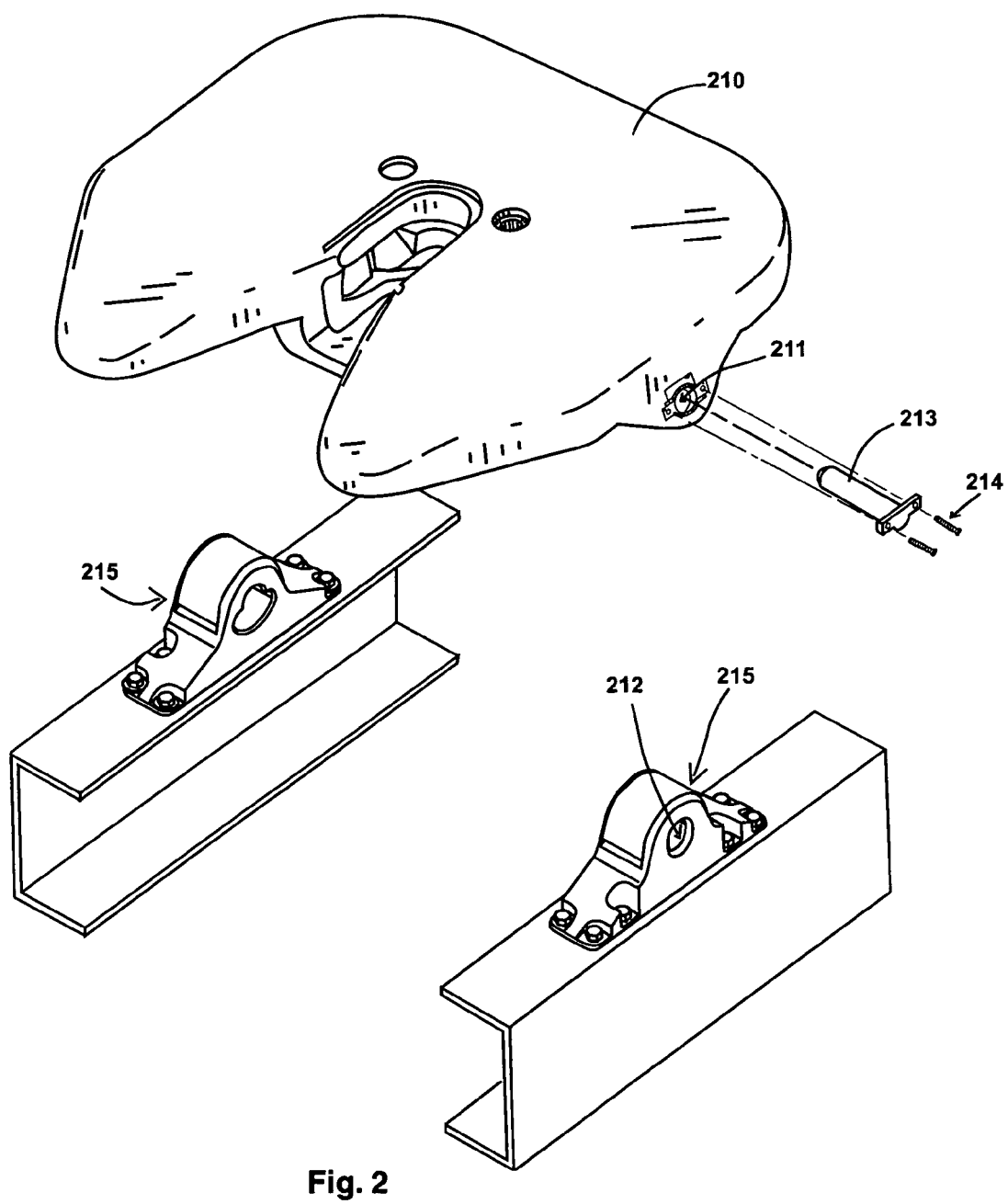
FIG. 2 is a fifth wheel incorporating an exemplary riser adaptation and fifth wheel mounting bracket to depict the coupling of the fifth wheel to the mounting bracket with a mounting pin.

The various embodiments of the present invention and their advantages are best understood by referring to FIGS. 1 through 11 of the drawings. The elements of the drawings are not necessarily to scale, emphasis instead being placed upon clearly illustrating the principles of the invention. Throughout the drawings, like numerals are used for like and corresponding parts of the various drawings.

A tractor 105 is attached to a trailer 110 by means of a fifth wheel assembly 115, attached to the tractor 105, which mates with a king pin 125 located on the trailer 110. A fifth wheel assembly typically comprises a hitch plate 210 which rests upon mounting brackets 215. The hitch plate 210 is secured to the mounting brackets 215 by a mounting pin 213 inserted through a hole 211 in the exterior of the hitch plate 210 and a corresponding hole 212 in the mounting bracket 215. The mounting pin 213 can be retained in place by bolts 214 which are inserted through the wings 605 (FIG. 6) of the mounting pin. Retaining pins can also be used for this purpose.

Figure 3:
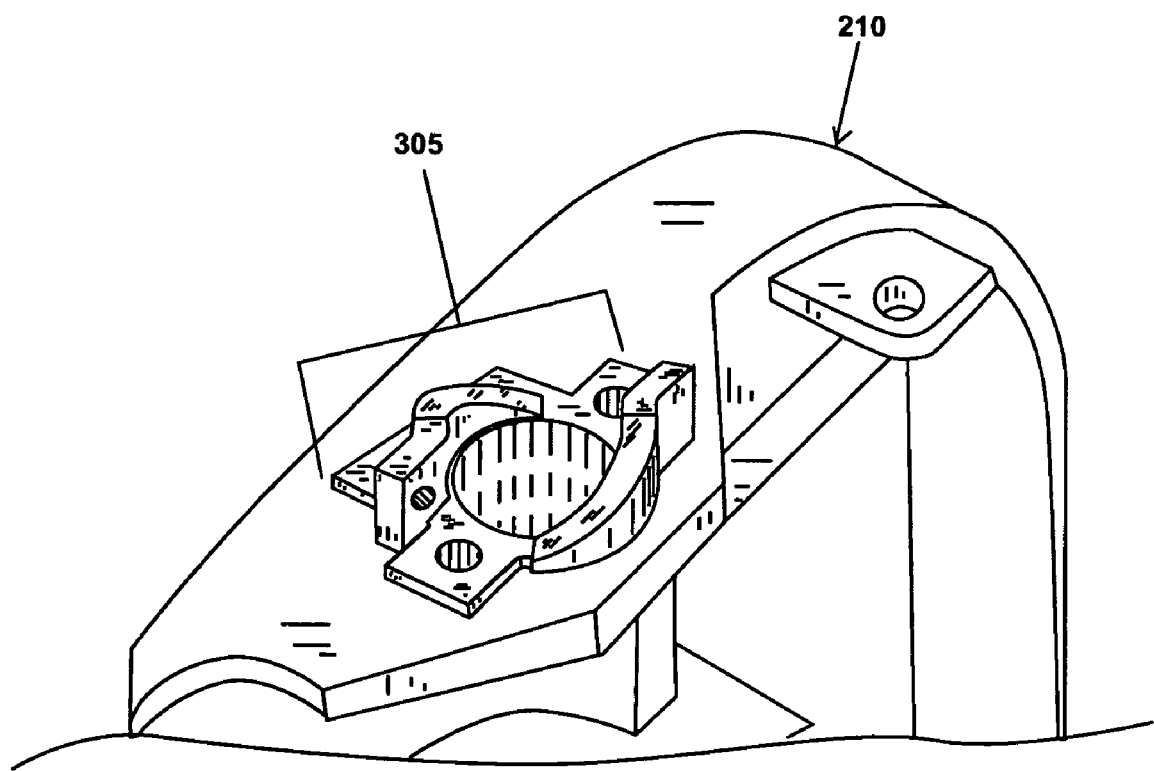
FIG. 3 is a perspective close-up view of a fifth wheel incorporating an exemplary riser adaptation.
Figure 4:
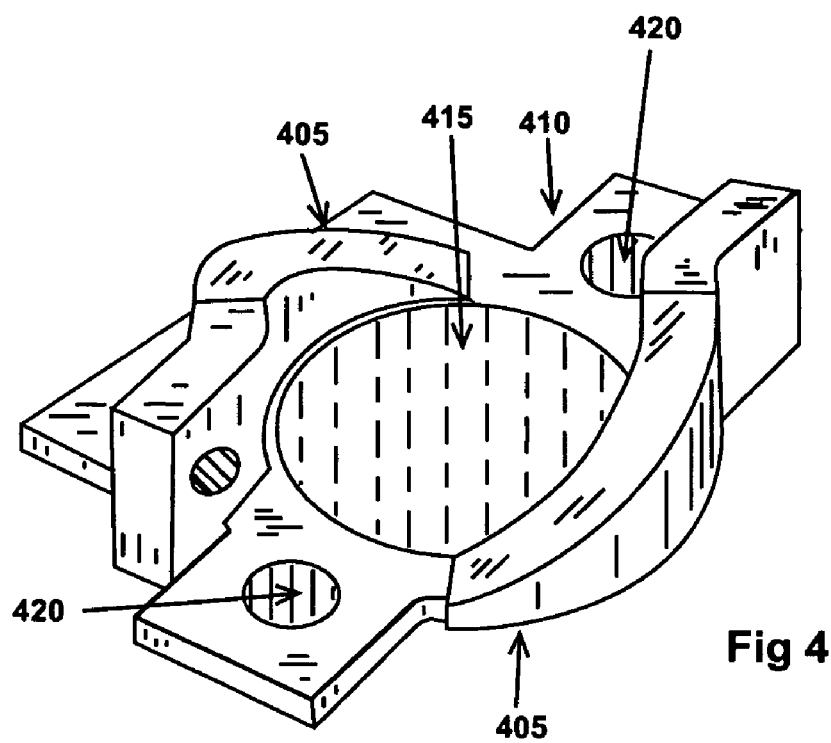
FIG. 4 is a perspective view of an exemplary riser adaptation.
Figure 5:
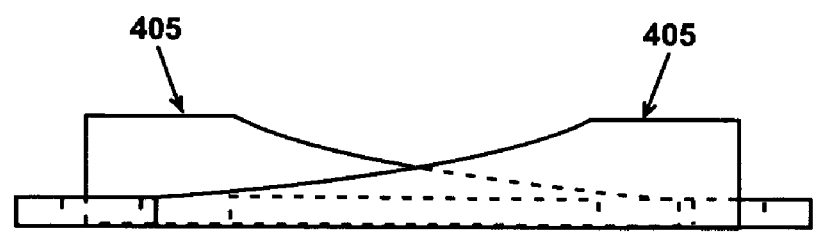
FIG. 5 is a side view of an exemplary riser adaptation.
Figure 6:
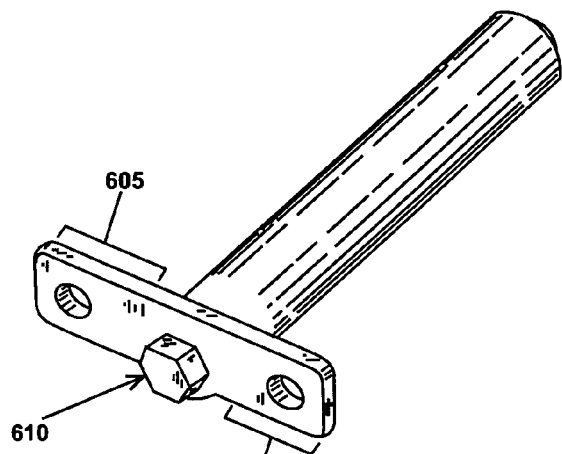
FIG. 6 is a perspective view of a fifth wheel mounting pin.

As shown in FIG. 3, the present invention is a riser adaptation 305 which can either be incorporated onto the side of the hitch plate 210 or retro-fit to the hitch plate 210 in order to facilitate the extraction of the mounting pin. As shown in FIG. 4, the preferred embodiment of the riser adaptation has a mounting pin hole 415 which corresponds to the holes in the hitch plate 211 and the mounting brackets 212, as well as two additional holes 420 with which to accommodate the retaining bolts or pins. Two ramps 405 start on opposite ends of the mounting pin hole 415 and ramp away from the plane of the mounting pin hole 415 along a generally arcuate path adjacent the mounting pin hole 415. The slope of the ramps 405 should be sufficient enough to allow the mounting pin to be easily pried from the fifth wheel assembly. The generally arcuate path of the ramps should match the circumference of the mounting pin hole 415 yet should not prevent the wings of the mounting pin from fitting flush against the riser adaptation. FIG. 5 shows the side elevation view of the ramps 405.

Figure 7:
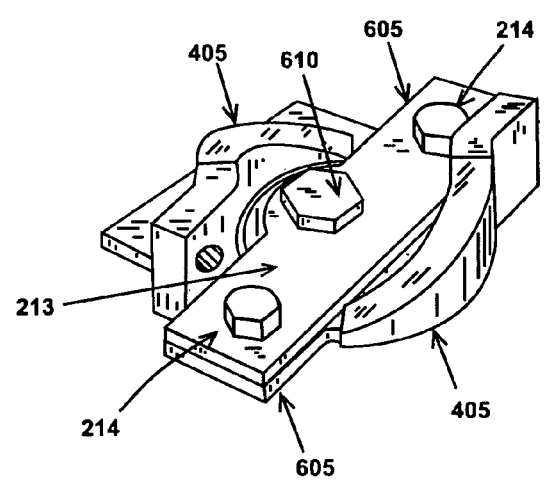
FIG. 7 is a perspective view of a fifth wheel mounting pin coupled to an exemplary riser adaptation.
Figure 8:
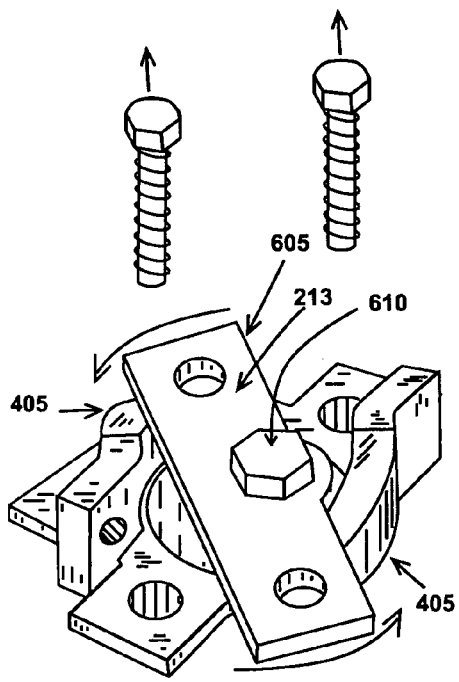
FIG. 8 is a perspective view of a fifth wheel mounting pin coupled to an exemplary riser adaptation, showing the removal of the mounting pin retaining bolts and the rotation of the mounting pin which causes the pin to move away from the fifth wheel assembly.
Figure 9:
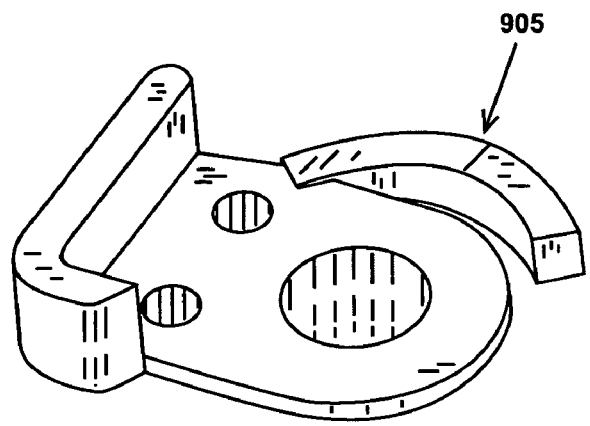
FIG. 9 is a perspective view of an alternative embodiment of a riser adaptation.
Figure 10:
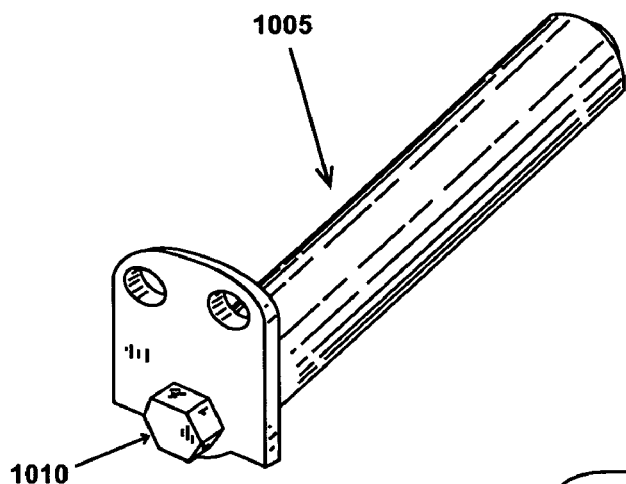
FIG. 10 is a perspective view of an alternative embodiment of a mounting pin.

FIG. 7 shows the mounting pin 213 as it would mate to the preferred embodiment of the riser adaptation, secured in place by bolts 214. As shown in FIG. 8, to extract the mounting pin 213, the bolts 214 are removed, and the mounting pin 213 is rotated such that the wings of the mounting pin 605 traverse the ramps 405, causing the mounting pin 213 to exit the fifth wheel assembly by moving away from the plane of the riser adaptation. The mounting pin 213 can be rotated by using suitable tools such as ratchets, wrenches, and others designed to fit the hex head bolt 610 incorporated on the mounting pin. The mounting pin 213 may also be equipped with a hex socket head or square head to allow for extraction by suitable tools.

Figure 11:
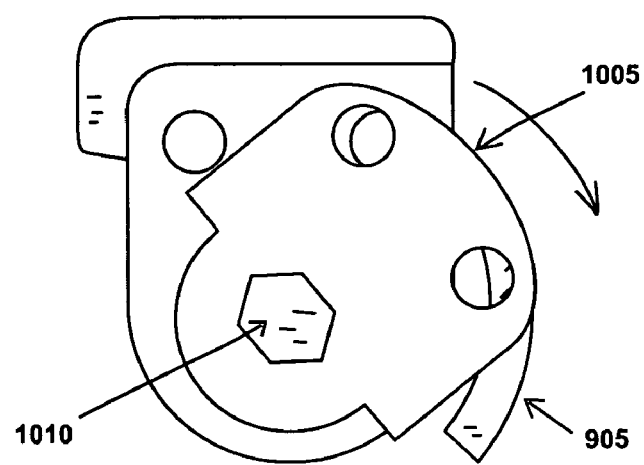
FIG. 11 is a front view of a fifth wheel mounting pin coupled to an alternative embodiment of a riser adaptation, showing the rotation of the mounting pin which causes the pin to move away from the fifth wheel assembly.

As seen in an alternative embodiment, the mounting pin 1005 (FIG. 10) may have only one wing with which to traverse the ramp. In that case, the riser adaptation should take the form of FIG. 9 and have one ramp 905. As shown in FIG. 11, with this embodiment, the ramp 905 is positioned such that rotating the mounting pin 1005 causes it to traverse the ramp 905 and exit the fifth wheel assembly by moving away from the plane of the riser adaptation. The mounting pin 1005 can include a hex head bolt 1010, a hex socket head or square head, to allow the mounting pin 1005 to be rotated using suitable tools.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

As described above and shown in the associated drawings, the present invention comprises a fifth wheel mounting pin riser adaptation. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

We claim:

1. A fifth wheel assembly comprising:
   i. a hitch plate with a mounting pin hole;
   ii. a mounting bracket for supporting said hitch plate, said mounting bracket having a first corresponding mounting pin hole, said first corresponding mounting pin hole corresponding to said mounting pin hole;
   iii. a riser adaptation with a second corresponding mounting pin hole, said second corresponding mounting pin hole correspond to said mounting pin hole, and said riser adaption having a generally arcuate ramp starting in the same plane as said second corresponding mounting pin hole and rising away from said hitch plate along the periphery of said second corresponding mounting pin hole; and
   iv. a winged mounting pin connecting said hitch plate to said mounting bracket by passing through said second corresponding mounting pin hole, said first corresponding mounting pin hole, and said mounting pin hole, wherein rotating said mounting pin causes the wing of said pin to traverse said ramp, displacing said mounting pin away from and out of said fifth wheel assembly.

2. The fifth wheel assembly of claim 1 wherein said riser adaptation is incorporated into said hitch plate at its initial manufacturing.

3. The fifth wheel assembly of claim 1 wherein said riser adaptation is attached to said hitch plate by an attachment means.

4. The fifth wheel assembly of claim 1 wherein said winged mounting pin includes a hex head bolt to allow for its rotation by standard tools.

5. The fifth wheel assembly of claim 4 further comprising a plurality of ramps along the periphery of said second corresponding mounting pin hole wherein the rotation of said mounting pin causes said pin to traverse said ramps, displacing said mounting pin away from and out of said fifth wheel assembly.

6. The fifth wheel assembly of claim 1 wherein said winged mounting pin includes a square socket head bolt to allow for its rotation by standard tools.

7. The fifth wheel assembly of claim 6 further comprising a plurality of ramps along the periphery of said second corresponding mounting pin hole wherein the rotation of said mounting pin causes said pin to traverse said ramps, displacing said mounting pin away from and out of said fifth wheel assembly.

8. The fifth wheel assembly of claim 1 wherein said winged mounting pin includes a hex socket head to allow for its rotation by standard tools.

9. The fifth wheel assembly of claim 8 further comprising a plurality of ramps along the periphery of said second corresponding mounting pin hole wherein the rotation of said mounting pin causes said pin to traverse said ramps, displacing said mounting pin away from and out of said fifth wheel assembly.

* * * * *